(12) United States Patent
Hirokubo et al.

(10) Patent No.: US 9,069,160 B2
(45) Date of Patent: Jun. 30, 2015

(54) OPTICAL FILTER, OPTICAL FILTER DEVICE, ANALYZER, AND METHOD FOR MANUFACTURING OPTICAL FILTER

(75) Inventors: Nozomu Hirokubo, Fujimi (JP); Tsukasa Funasaka, Shiojiri (JP)

(73) Assignee: Seiko Epson Corporation (JP)

( * ) Notice: Subject to any disclaimer, the term of this patent is extended or adjusted under 35 U.S.C. 154(b) by 377 days.

(21) Appl. No.: 12/787,633

(22) Filed: May 26, 2010

(65) Prior Publication Data

US 2010/0302660 A1 Dec. 2, 2010

(30) Foreign Application Priority Data

May 27, 2009 (JP) ................. 2009-127877
Apr. 1, 2010 (JP) ................. 2010-085353

(51) Int. Cl.
*G02B 26/00* (2006.01)
*G01J 3/26* (2006.01)
*G01J 3/42* (2006.01)
*G01J 3/51* (2006.01)

(52) U.S. Cl.
CPC ............... *G02B 26/001* (2013.01); *G01J 3/26* (2013.01); *G01J 3/42* (2013.01); *G01J 3/51* (2013.01)

(58) Field of Classification Search
CPC ...... G02B 26/001; G02B 26/0841; G01J 3/26
USPC ............ 359/223.1, 224.1, 291, 578, 850; 356/454, 506
See application file for complete search history.

(56) References Cited

U.S. PATENT DOCUMENTS

| 4,247,166 | A | * | 1/1981 | Yeh | 359/484.01 |
| 4,269,481 | A | * | 5/1981 | Yeh et al. | 359/259 |
| 4,508,964 | A | * | 4/1985 | Gunning et al. | 250/201.1 |
| 4,790,634 | A | * | 12/1988 | Miller et al. | 349/198 |
| 5,068,749 | A | * | 11/1991 | Patel | 349/198 |
| 6,400,738 | B1 | * | 6/2002 | Tucker et al. | 372/20 |
| 7,098,517 | B2 | * | 8/2006 | Matsuo | 257/415 |
| 7,142,346 | B2 | * | 11/2006 | Chui et al. | 359/290 |
| 7,199,928 | B2 | * | 4/2007 | Uehara | 359/586 |
| 7,265,477 | B2 | * | 9/2007 | Wan | 310/309 |
| 7,301,703 | B2 | * | 11/2007 | Nakamura et al. | 359/578 |
| 7,720,117 | B2 | * | 5/2010 | Liu | 372/20 |
| 7,734,131 | B2 | * | 6/2010 | Lin et al. | 385/27 |
| 8,319,169 | B2 | * | 11/2012 | Funasaka | 250/216 |

(Continued)

FOREIGN PATENT DOCUMENTS

| CN | 101004476 A | 7/2007 |
| JP | 2000-258701 A | 9/2000 |

(Continued)

*Primary Examiner* — Ricky D Shafer
(74) *Attorney, Agent, or Firm* — Harness, Dickey & Pierce, P.L.C.

(57) ABSTRACT

An optical filter includes: a first substrate and a second substrate that are disposed to face each other; a first mirror and a first electrode that are disposed on the second substrate side of the first substrate; and a second mirror and a second electrode that are disposed on the first substrate side of the second substrate, wherein the first mirror and the second mirror are connected via a wire.

13 Claims, 8 Drawing Sheets

(56) References Cited

U.S. PATENT DOCUMENTS

| | | | |
|---|---|---|---|
| 8,559,090 B2 * | 10/2013 | Pan | 359/260 |
| 2005/0122191 A1 * | 6/2005 | Nakamura et al. | 333/202 |
| 2006/0249801 A1 | 11/2006 | Matsuo | |
| 2007/0171531 A1 | 7/2007 | Nakamura | |
| 2008/0003737 A1 | 1/2008 | Tung et al. | |
| 2010/0302660 A1 | 12/2010 | Hirokubo et al. | |
| 2011/0222158 A1 * | 9/2011 | Sano | 359/584 |
| 2011/0261460 A1 * | 10/2011 | Yamazaki et al. | 359/578 |
| 2012/0147380 A1 * | 6/2012 | Matsushita et al. | 356/456 |
| 2012/0200926 A1 * | 8/2012 | Matsushita | 359/578 |

FOREIGN PATENT DOCUMENTS

| | | |
|---|---|---|
| JP | 2004-212638 | 7/2004 |
| JP | 2005-066727 | 3/2005 |
| JP | 2008-116669 | 5/2008 |
| JP | 2008-116689 | 5/2008 |
| JP | 2008-187881 | 8/2008 |
| JP | 2011-008225 A | 1/2011 |
| TW | 2008-07061 A | 2/2008 |

* cited by examiner

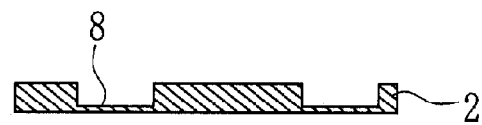
FIG. 5A
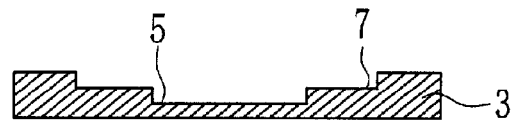
FIG. 5B
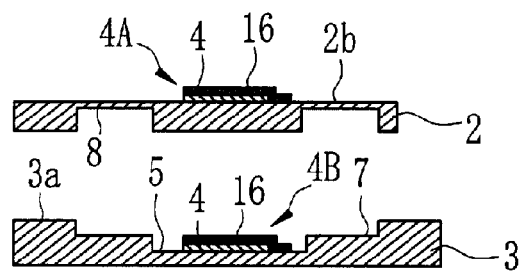
FIG. 5C
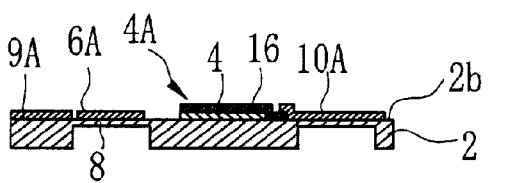
FIG. 5D
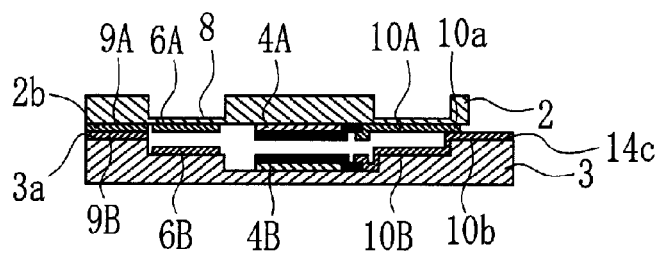

OPTICAL FILTER, OPTICAL FILTER DEVICE, ANALYZER, AND METHOD FOR MANUFACTURING OPTICAL FILTER

BACKGROUND

1. Technical Field

The present invention relates to an optical filter, an optical filter device, an analyzer, and a method for manufacturing an optical filter.

2. Related Art

As optical filters that select light having a wavelength as a target from incident light and allow the light to be emitted in the related art, an optical filter having a structure in which a pair of substrates are disposed to face each other, a mirror is disposed on each facing surface of the substrates, an electrode is disposed around each of the mirrors, and a diaphragm portion is disposed around at least one of the mirrors has been known. Such an optical filter can selectively extract light having a wavelength corresponding to the gap between the pair of facing mirrors. Voltage is applied to a fixed electrode disposed on one of the substrates and a movable electrode disposed on the other substrate, whereby the gap between the mirrors can be controlled to a desired value by electrostatic drive.

In the manufacturing process of the optical filter, upon bonding the pair of substrates together, surface activated bonding is used in which bonding surfaces are activated by etching with ion beam or plasma in vacuum to bond the substrates together (JP-A-2008-116669).

However, when the substrates are bonded together by surface activated bonding, the mirrors are charged due to ion beam, plasma or an electrostatic chuck used for supporting the substrate, or the like, causing a problem in that the mirrors stick together by an electrostatic attraction caused by charges accumulating on the mirrors when the substrates are bonded together.

SUMMARY

An advantage of some aspects of the invention is to provide an optical filter in which mirrors are prevented from being charged to thereby eliminate sticking of the mirrors together, an optical filter device, an analyzer, and a method for manufacturing an optical filter.

A first aspect of the invention is directed to an optical filter including: a first substrate and a second substrate that are disposed to face each other; a first mirror and a first electrode that are disposed on the second substrate side of the first substrate; and a second mirror and a second electrode that are disposed on the first substrate side of the second substrate, wherein the first mirror and the second mirror are connected via a wire.

According to the first aspect of the invention, since the first mirror and the second mirror are connected via the wire, the mirrors are electrically short-circuited, thereby making it possible to eliminate the potential difference between the mirrors. This can prevent the sticking of the mirrors together caused by the charge of the mirrors, and therefore the gap between the mirrors can be accurately controlled. Accordingly, a highly reliable optical filter is obtained.

It is preferable that the optical filter further includes a first wire that is extended from the first mirror to a bonding region of the first substrate and a second wire that is extended from the second mirror to a bonding region of the second substrate, and that the first wire and the second wire are connected to each other in the bonding regions.

According to the first aspect of the invention, since the first wire and the second wire are connected simultaneously when the substrates are bonded together, the optical filter can be manufactured by a simple process.

It is preferable that one of the first mirror and the second mirror is connected to an external connection terminal.

According to the first aspect of the invention, charges accumulating on the first mirror and the second mirror can be discharged from the external connection terminal.

A second aspect of the invention is directed to an optical filter including: a first substrate and a second substrate that are disposed to face each other; a first mirror and a first electrode that are disposed on the second substrate side of the first substrate; and a second mirror and a second electrode that are disposed on the first substrate side of the second substrate, wherein the first mirror and the second mirror are respectively connected to external connection terminals.

According to the second aspect of the invention, the first mirror and the second mirror are respectively connected to different external connection terminals. Therefore, a ground potential can be input from the respective external connection terminals to the first mirror and the second mirror, making it possible to eliminate the potential difference between the mirrors. This can prevent the sticking of the mirrors together, and therefore the gap between the mirrors can be accurately controlled. Accordingly, a highly reliable optical filter is obtained.

It is preferable that the first mirror and the second mirror are respectively connected to the external connection terminals via a wire.

According to the second aspect of the invention, it is possible to reliably connect the mirror that is generally disposed at the central portion of the substrate and the external connection terminal that is disposed at the edge portion of the substrate via the wire. Moreover, the degree of design freedom of the members on the substrate is enhanced.

It is preferable that a bump structure having an elastic body therein is formed at a connection portion of the first wire and the second wire.

According to the first aspect of the invention, since the bump structure having an elastic body therein is formed at the connection portion of the first wire and the second wire, the connection between the wires can be reliably and favorably made.

It is preferable that the first mirror and the second mirror are configured to include a conductive film.

According to the first aspect of the invention, each of the first mirror and the second mirror is configured to include a conductive film. Therefore, the mirrors are short-circuited, making it possible to eliminate the potential difference between the mirrors.

It is preferable that the first mirror and the second mirror have a stacked structure of a light-transmissive conductive film and a dielectric film.

According to the first aspect of the invention, it is possible to prevent charges from accumulating on the surface of the dielectric film.

It is preferable that a remaining portion formed by cutting a wire that is connected to the external connection terminals is formed.

According to the second aspect of the invention, the remaining portion formed by cutting the wire that connects between the external connection terminals connected to the respective mirrors is formed. Therefore, at the time of manufacture described later, the external connection terminals connected to the respective mirrors are connected by the wire.

This can eliminate the sticking of the mirrors caused by the charge at the time of manufacture.

A third aspect of the invention is directed to an optical filter device including: the optical filter according to the first aspect of the invention; and a light-receiving element that receives light having passed through the optical filter.

According to the third aspect of the invention, the optical filter device that can generate an electric signal by receiving light having passed through the optical filter with the light-receiving element is obtained.

A fourth aspect of the invention is directed to an analyzer including: the optical filter according to the first aspect of the invention; a light-receiving element that receives light having passed through the optical filter; a drive circuit portion that drives a gap between the first mirror and the second mirror of the optical filter; and a measurement circuit portion that measures the amount of the passed light based on an electric signal generated by the light-receiving element.

According to the fourth aspect of the invention, the analyzer is obtained in which light reflected by an object to be measured is incident on the optical filter, the drive circuit portion controls the gap between the mirrors of the optical filter, the light-receiving element receives the light having passed through the optical filter with the controlled gap, the light-receiving element generates an electric signal corresponding to the amount of the received light, and the measurement circuit portion measures the amount of the passed light based on the generated electric signal. Thus, the gap between the mirrors of the optical filter can be accurately controlled.

A fifth aspect of the invention is directed to a method for manufacturing an optical filter including: forming a first mirror or a second mirror on facing surface sides of a first substrate and a second substrate; forming an electrode around the first mirror and the second mirror; forming a wire connected to the first mirror and the second mirror; and bonding the first substrate and the second substrate, wherein in the bonding of the first substrate and the second substrate, the first mirror and the second mirror are connected via the wire.

According to the fifth aspect of the invention, in the bonding of the first substrate and the second substrate, the first mirror and the second mirror are connected via the wire. Therefore, the mirrors are electrically short-circuited, making it possible to eliminate the potential difference between the mirrors. This can prevent the sticking of the mirrors together, and therefore the gap between the mirrors can be accurately controlled. Accordingly, a highly reliable optical filter is obtained.

It is preferable that in the forming of the wire connected to the first mirror and the second mirror, a first wire is formed by extending from the first mirror to a bonding region of the first substrate, and a second wire is formed by extending from the second mirror to a bonding region of the second substrate, and in the bonding of the first substrate and the second substrate, the first wire and the second wire are connected.

According to the fifth aspect of the invention, since the first mirror and the second mirror are connected via the first wire and the second wire formed in the bonding regions, the wires can be reliably connected to each other simultaneously when the substrates are bonded together. This realizes an electrical connection between the mirrors. Moreover, the connection state can be assured even after the completion of the optical filter.

It is preferable that when the first wire or the second wire is formed, a bump structure having an elastic body therein is formed at a portion where the first wire and the second wire are connected to each other in the subsequent bonding of the first substrate and the second substrate.

According to the fifth aspect of the invention, since the bump structure is formed at the portion where the first wire and the second wire are connected to each other, the connection reliability between the wires can be enhanced.

It is preferable that after bonding the first substrate and the second substrate, the wire is cut.

According to the fifth aspect of the invention, after the first substrate and the second substrate are bonded together, the wire connected between the first mirror and the second mirror is cut. Therefore, the mirrors are electrically isolated from each other, making it possible to supply independent potentials to the respective mirrors. Thus, the gap between the mirrors can be accurately controlled.

A sixth aspect of the invention is directed to a method for manufacturing an optical filter including: forming a first mirror or a second mirror on facing surface sides of a first substrate and a second substrate; forming an electrode around the first mirror and the second mirror; forming a wire connected to the first mirror and the second mirror; and bonding the first substrate and the second substrate, wherein in the bonding of the first substrate and the second substrate, the first substrate and the second substrate are bonded in a state where a potential is input to the wire.

According to the sixth aspect of the invention, in the bonding of the first substrate and the second substrate, the first substrate and the second substrate are bonded together in the state where a potential is input to the wire. Therefore, the mirrors can have the same potential at the time of bonding the first substrate and the second substrate. This can prevent the sticking of the mirrors together, and therefore the gap between the mirrors can be accurately controlled. Accordingly, a highly reliable optical filter can be obtained.

It is preferable that a pair of external connection terminals that are connected to the first mirror and the second mirror are formed on one of the first substrate and the second substrate, and a potential is input to the first mirror and the second mirror via the pair of external connection terminals.

According to the sixth aspect of the invention, since the external connection terminals that are respectively connected to the mirrors are disposed, an independent potential can be supplied to each of the mirrors. Thus, the gap between the mirrors can be accurately controlled.

BRIEF DESCRIPTION OF THE DRAWINGS

The invention will be described with reference to the accompanying drawings, wherein like numbers reference like elements.

FIGS. 5A to 5D are flow sheets showing the method for manufacturing the optical filter of the first embodiment.

DESCRIPTION OF EXEMPLARY EMBODIMENTS

Figure 1:
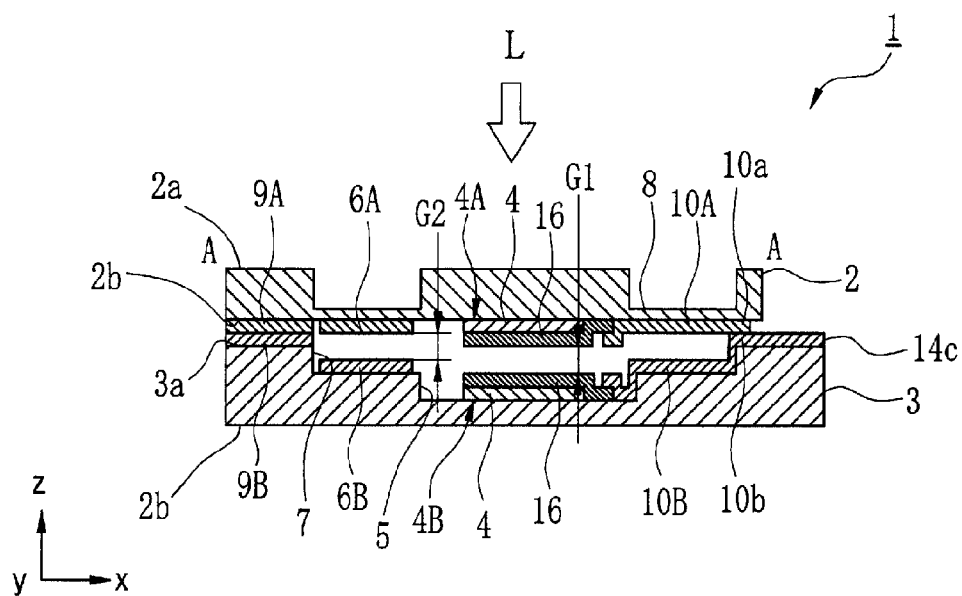
FIG. 1 is a cross-sectional view showing an optical filter of a first embodiment.

Hereinafter, embodiments of the invention will be described with reference to the drawings. In the drawings used for the following description, the scale of each of members is appropriately changed for making the size of each of the members recognizable.

First Embodiment

Figure 2:
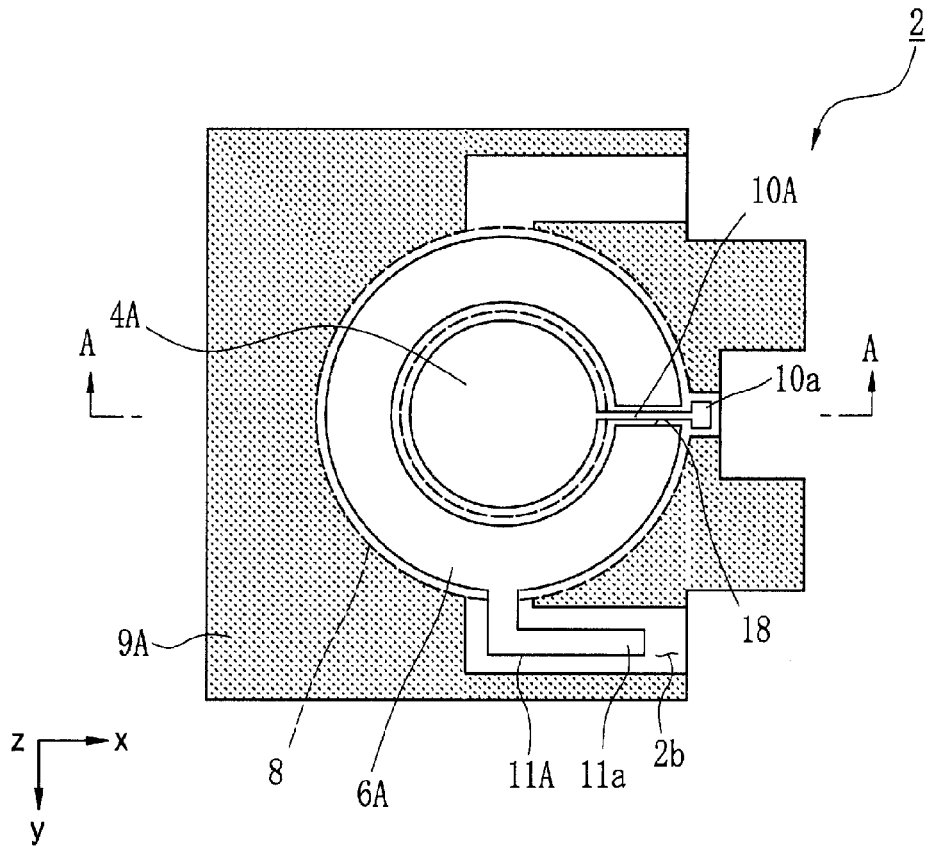
FIG. 2 is a plan view showing a first substrate constituting the optical filter of the first embodiment.
Figure 3:
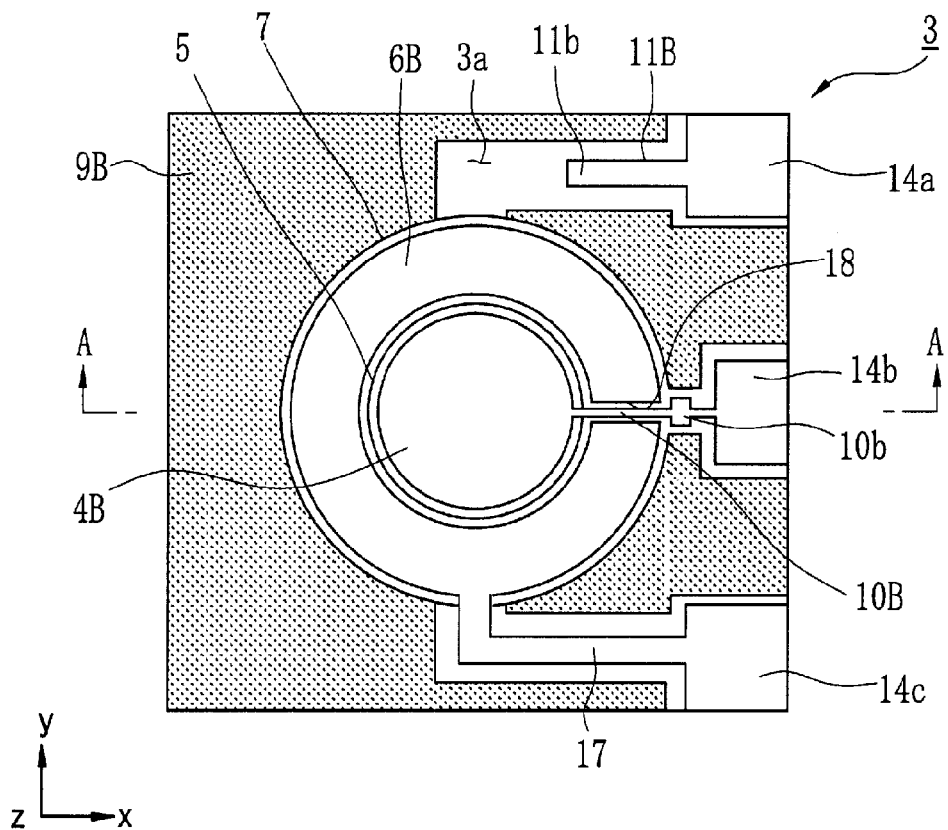
FIG. 3 is a plan view showing a second substrate constituting the optical filter of the first embodiment.

FIG. 1 is a cross-sectional view showing an optical filter as a first embodiment of the invention. FIG. 2 is a plan view of a first substrate 2 constituting the optical filter as viewed from a bonding surface 2b side. FIG. 3 is a plan view of a second substrate 3 constituting the optical filter as viewed from a bonding surface 3a side.

The optical filter 1 of the embodiment shown in FIGS. 1 to 3 is an electrostatically-driven airgap type etalon element.

The optical filter 1 includes the first substrate 2 and the second substrate 3 bonded to the first substrate 2 in a facing state.

As shown in FIGS. 1 and 2, on the first substrate 2, a mirror 4A (first mirror), an electrode 6A, a diaphragm portion 8, a bonding metal film 9A, a first wire 10A, and an inter-substrate conducting wire 11A are disposed. The mirror 4A is circular in a plane view and disposed at the central portion of the bonding surface 2b on the side facing the second substrate 3. The electrode 6A is substantially annular and disposed around the mirror 4A of the first substrate 2. The diaphragm portion 8 is thin and annular, and formed by etching (selectively removing) in the first substrate 2 at a position substantially corresponding to the outer peripheral portion of the electrode 6A. The bonding metal film 9A is disposed around the electrode 6A. The first wire 10A is extended from the mirror 4A to a bonding region (region not overlapping with the diaphragm portion 8 in a plane view) outside of the first electrode 6A. The inter-substrate conducting wire 11A has a connection portion 11a that is at least extended from the first electrode 6A to the bonding region.

As shown in FIGS. 1 and 3, on the second substrate 3, a mirror 4B (second mirror), an electrode 6B, a bonding metal film 9B, a second wire 10B, a plurality of electrode pads 14a, 14b, and 14c, and an inter-substrate conducting wire 11B are disposed. The mirror 4B is circular in a plane view and disposed so as to face the mirror 4A via a first gap G1 at the bottom of a first recessed portion 5 that is formed at the central portion of the second substrate 3. The electrode 6B is substantially annular and disposed so as to face the electrode 6A via a second gap G2 in a second recessed portion 7 that is shallow and annular and formed around the first recessed portion 5 of the second substrate 3. The bonding metal film 9B is disposed around the electrode 6B. The second wire 10B is extended from the mirror 4B to a bonding region (region not overlapping with the recessed portions 5 and 7 in a plane view) outside of the second electrode 6B. The electrode pads 14a, 14b, and 14c are formed on the side edge of the bonding surface 3a. The inter-substrate conducting wire 11B has at an end on the opposite side to an end that is connected to the electrode pad 14a a connection portion 11b that is electrically connected to the connection portion 11a of the inter-substrate conducting wire 11A.

The first substrate 2 and the second substrate 3 are generally rectangular or square in a plane view and have such sizes that a part of the second substrate 3 extends from the first substrate 2. The first substrate 2 and the second substrate 3 are made of a light-transmissive, insulative material. It is especially preferable that the first substrate 2 and the second substrate 3 are formed of a transparent material such as glass.

As glass, specifically, soda glass, crystallized glass, silica glass, lead glass, potassium glass, borosilicate glass, sodium borosilicate glass, alkali-free glass, or the like is suitably used.

In this manner, when both the first substrate 2 and the second substrate 3 are formed of a light-transmissive material, an electromagnetic wave of a desired wavelength band among electromagnetic waves or visible light rays can be used as incident light.

When both the first substrate 2 and the second substrate 3 are formed of a semiconductor material, for example, silicon, near infrared rays can be used as incident light.

The mirrors 4A and 4B each include a dielectric multi-layer film 4 having a plurality of high refractive index layers and a plurality of low refractive index layers stacked alternately and a conductive film 16 formed of a transparent metal material such as ITO. Between the mirrors 4A and 4B, the mirror 4A is sometimes referred to as a movable mirror because the mirror 4A is disposed on the first substrate 2 that is deformable, while the mirror 4B is sometimes referred to as a fixed mirror because the mirror 4B is disposed on the second substrate 3 that does not deform.

When the optical filter 1 is used in the region of visible light rays or in the region of infrared rays, for example, titanium oxide ($Ti_2O$), tantalum oxide ($Ta_2O_5$), niobium oxide ($Nb_2O_5$), or the like is used as a material for forming the high refractive index layer in the dielectric multi-layer film. When the optical filter 1 is used in the region of ultraviolet rays, for example, aluminum oxide ($Al_2O_3$), hafnium oxide ($HfO_2$), zirconium oxide ($ZrO_2$), thorium oxide ($ThO_2$), or the like is used as the material for forming the high refractive index layer.

On the other hand, as a material for forming the low refractive index layer in the dielectric multi-layer film, for example, magnesium fluoride ($MgF_2$), silicon oxide ($SiO_2$), or the like is used.

The number of layers and thickness of the high refractive index layer and the low refractive index layer are properly set based on required optical characteristics. When the dielectric multi-layer film is used, the number of layers required for obtaining the optical characteristics is generally 12 or more. The conductive films 16 and 16 are respectively formed on the dielectric multi-layer films 4 and 4.

Examples of material of the conductive film 16 include, for example, a transparent conductive film such as ITO and a thin metal film. The conductive films 16 described above cover the entire surfaces of the dielectric multi-layer films 4 and 4, making it possible to prevent the mirrors 4A and 4B from being charged when the substrates 2 and 3 are bonded together at the time of manufacture described later. The wires 10A and 10B are respectively connected to the conductive films 16.

The first wire 10A and the second wire 10B are connected to each other at the connection portions 10a and 10b that are respectively disposed at their front ends. Thus, the mirrors 4A and 4B are electrically connected to each other. Between the wires 10A and 10B, the second wire 10B is further connected to the electrode pad 14b (external connection terminal) for grounding.

The first electrode 6A and the second electrode 6B are disposed so as to face each other via the second gap G2. The first electrode 6A and the second electrode 6B constitute a part of a static actuator that generates an electrostatic force between the electrodes 6A and 6B according to an input drive voltage to thereby cause the mirrors 4A and 4B to relatively move in a state where they face each other. Thus, the electrodes 6A and 6B displace the diaphragm portion 8 in a vertical direction (z-direction) in FIG. 1 to change the first gap G1 between the mirrors 4A and 4B, thereby allowing light having a wavelength corresponding to the first gap G1 to be emitted.

A material for forming the electrodes 6A and 6B is not particularly limited as long as it is conductive. For example, a metal such as Cr, Al, an Al alloy, Ni, Zn, Ti, or Au, a resin having carbon or titanium dispersed therein, silicon such as polycrystalline silicon (polysilicon) or amorphous silicon, silicon nitride, or a transparent conductive material such as ITO is used.

The electrode 6A is connected to the electrode pad 14a via the inter-substrate conducting wires 11A and 11B. The electrode 6B is connected to the electrode pad 14c via a wire 17. The electrode pads 14a and 14c are connected to a power source (not shown).

In a part of each of the electrodes 6A and 6B in a circumferential direction, a gap portion 18 is formed. The first wire 10A and the second wire 10B connected to the mirrors 4A and 4B are respectively extended to the outside of the electrodes 6A and 6B through the gap portions 18.

The power source applies voltage to the electrodes 6A and 6B as a drive signal to drive the electrodes 6A and 6B, thereby generating a desired electrostatic force therebetween. A controller (not shown) is connected to the power source. The power source is controlled by the controller, whereby the potential difference between the electrodes 6A and 6B can be adjusted.

The diaphragm portion 8 is reduced in thickness compared to the portions of the first substrate 2 where the diaphragm portion 8 is not formed. The portion of the first substrate 2 where the thickness is reduced compared to the other portions is elastically (flexibly) deformable (displaceable). With this configuration, the diaphragm portion 8 has a wavelength selecting function of changing the first gap G1 to change the gap between the mirrors 4A and 4B into a gap corresponding to light having a desired wavelength, thereby allowing the light having the desired wavelength to be emitted.

Any shape, thickness, or the like of the diaphragm portion 8 is applicable as long as the diaphragm portion can allow light in a desired wavelength range to be emitted. Specifically, the shape, thickness, or the like of the diaphragm portion is set in accordance with a wavelength range of emitting light that is required for the optical filter 1, in view of the amount of change, rate of change, etc. of the gap between the mirrors 4A and 4B.

The diaphragm portion 8 is formed by etching (selectively removing) the first substrate 2 from a surface 2a side. However, it is sufficient that the diaphragm portion 8 has a thickness enough to absorb deflection to be generated, thereby suppressing the propagation of the deflection to the mirror 4A. The diaphragm portion 8 may be formed by etching (selectively removing) the first substrate 2 from both the surface 2a and the surface 2b.

In the optical filter 1 of the embodiment, the static actuator of the optical filter 1 is configured from the electrodes 6A and 6B that are disposed so as to face each other via the second gap G2 formed between the substrates 2 and 3 and the diaphragm portion 8.

The operation (effect) of the optical filter 1 having such a configuration will be described.

When voltage is applied between the first electrode 6A and the second electrode 6B by a not-shown conducting circuit, the first electrode 6A and the second electrode 6B are charged in opposite polarities to generate the Coulomb force (electrostatic attraction) therebetween. In this case, a not-shown detection circuit detects the displacement state of the diaphragm portion 8. Based on the detected result, a not-shown control unit controls driving of the conducting circuit.

By the Coulomb force, the diaphragm portion 8 moves (displaces) downward toward the second electrode 6B. This changes the size of the first gap G1 and the second gap G2.

As shown in FIG. 1, on the other hand, when light L is irradiated from above the optical filter 1 toward the first gap G1, the light L passes through the first substrate 2 and the mirror 4A to enter the first gap G1.

In the course of repetitive reflection of the light between the mirror 4A and the mirror 4B as described above, light having a wavelength that does not satisfy an interference condition corresponding to the size of the first gap G1 between the mirror 4A and the mirror 4B is drastically attenuated, and only light having a wavelength that satisfies the interference condition remains and is eventually emitted from the optical filter 1.

Accordingly, when the voltage to be applied between the first electrode 6A and the second electrode 6B is changed to change the first gap G1 (that is, change the interference condition), the wavelength of light passing through the optical filter 1 can be changed.

Figure 4:
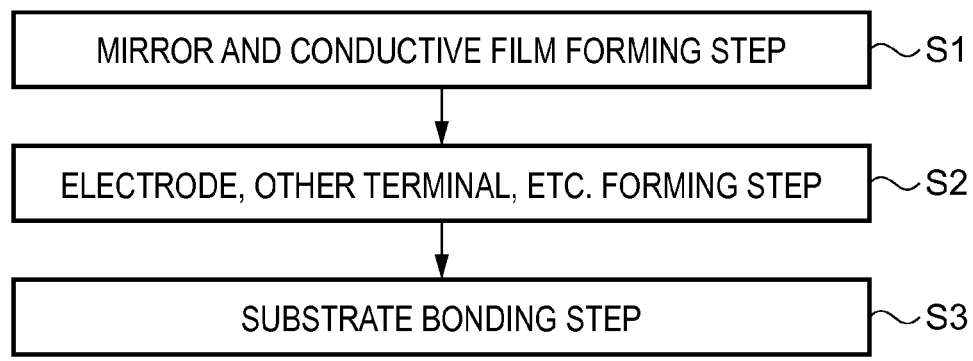
FIG. 4 is a flowchart showing a method for manufacturing the optical filter of the first embodiment.

Next, a method of manufacturing the optical filter in the embodiment will be described. FIG. 4 is a flowchart showing the method for manufacturing the optical filter in the embodiment. FIGS. 5A to 5D are flow sheets of the manufacturing method.

As shown in FIG. 4, the method for manufacturing the optical filter includes a mirror and conductive film forming step S1, an electrode, other terminal, etc. forming step S2, and a substrate bonding step S3.

For forming the optical filter 1, the first substrate 2 and the second substrate 3 subjected to a predetermined process are first prepared as shown in FIG. 5A. The diaphragm portion 8 is previously formed in the first substrate 2. The first recessed portion 5 and the second recessed portion 7 are previously formed in the second substrate 3.

In the mirror and conductive film forming step S1, the dielectric multi-layer film 4 is first formed at the central portion of the first substrate 2 as shown in FIG. 5B, and the dielectric multi-layer film 4 is formed at the central portion of the first recessed portion 5 in the second substrate 3. Thereafter, the conductive films 16 and 16 are formed on the respective dielectric multi-layer films 4 and 4 so as to cover the entire surfaces thereof.

Next, in the electrode, other terminal, etc. forming step S2, the electrodes 6A and 6B, the first wire 10A, the second wire 10B, the bonding metal films 9A and 9B, the inter-substrate conducting wires 11A and 11B (not shown), and the electrode pad 14c (the electrode pads 14a and 14b are not shown) are pattern formed on the bonding surfaces 2b and 3a of the first substrate 2 and the second substrate 3 as shown in FIG. 5C.

In the substrate bonding step S3, bonding of the substrates 2 and 3 is performed by using a surface activated bonding apparatus (not shown). In the surface activated bonding, surfaces serving as bonding surfaces are subjected to surface treatment under reduced pressure (in vacuum), whereby atoms of the bonding surfaces are brought into an activated state where the atoms are easily bound chemically, and thereafter the bonding is performed under low temperature such as a room temperature.

Specifically, the substrates 2 and 3 are first put in a vacuum chamber of the surface activated bonding apparatus. The first substrate 2 is fixed to a chuck on the upper side by suction with an electrostatic force, and the second substrate 3 is mounted on a base on the lower side. As shown in FIG. 5D, the bonding surface 2b of the first substrate 2 and the bonding surface 3a of the second substrate 3 face each other and are aligned with each other, and the bonding of them is performed.

When the substrates 2 and 3 are aligned with each other, the connection portion 10a of the first wire 10A is matched with the connection portion 10b of the second wire 10B in a plane view, and the connection portion 11a of the not-shown inter-substrate conducting wire 11A is matched with the connection portion 11b of the inter-substrate conducting wire 11B in a plane view.

In vacuum (under reduced pressure), sputtering is performed with ion beam, plasma, or the like on the surfaces of the bonding metal films 9A and 9B serving as bonding surfaces to activate the surfaces. This removes contaminants etc. on the bonding metal films 9A and 9B, and the bonding metal films 9A and 9B are brought into a state where atoms with bonds are exposed.

The first substrate 2 and the second substrate 3 are pressed to each other at a room temperature such that the surfaces of the bonding metal films 9A and 9B in the above-described state are brought into contact (pressure-bonded) with each other, whereby the bonding metal films 9A and 9B, that is, the substrates 2 and 3 can be easily and firmly bonded together. At the same time of bonding, the movable mirror 4A on the first substrate 2 side and the fixed mirror 4B on the second substrate 3 side are electrically connected to each other via the connection portions 10a and 10b.

According to the optical filter 1 and the manufacturing method therefor according to the embodiment, the pair of facing mirrors 4A and 4B are electrically short-circuited in the substrate bonding step S3 to eliminate the potential difference between the mirrors 4A and 4B. Thus, sticking of the mirrors 4A and 4B together can be eliminated at the time of bonding.

In the bonding step as described above, ion beam or plasma used for the surface activation treatment of the bonding surfaces of the substrates 2 and 3, the electrostatic chuck used when the first substrate 2 is fixed to the chuck on the upper side in the vacuum chamber, or the like causes the mirrors 4A and 4B to be charged, thereby generating the potential difference between the mirrors 4A and 4B. Then, the mirrors 4A and 4B are sometimes stuck together by an electrostatic attraction due to the charges accumulating on the mirrors 4A and 4B at the time of bonding the substrates 2 and 3.

In the embodiment, therefore, the connection portions 10a and 10b of the first wire 10A and the second wire 10B are connected at the time of bonding the substrates to short-circuit between the mirrors 4A and 4B, whereby the potential difference between the mirrors 4A and 4B charged by the surface activation treatment or the like is eliminated. Thus, sticking of the mirrors 4A and 4B together after bonding can be eliminated. Also in the configuration after completion, since the mirrors 4A and 4B are in the short-circuited state, it is possible to prevent the mirrors 4A and 4B from being charged due to driving of the static actuator. It is preferable that the electrode pad 14b is grounded to discharge the charges accumulating on the mirrors 4A and 4B to the outside. This makes it possible to accurately control the gap between the mirrors 4A and 4B to thereby improve the reliability of the optical filter.

In the embodiment, although the first wire 10A extended from the mirror 4B is connected to the electrode pad 14b, the first wire 10A may be bonded to the bonding metal film 9B. In this case, the bonding metal film 9B is grounded.

Second Embodiment

Figure 6:
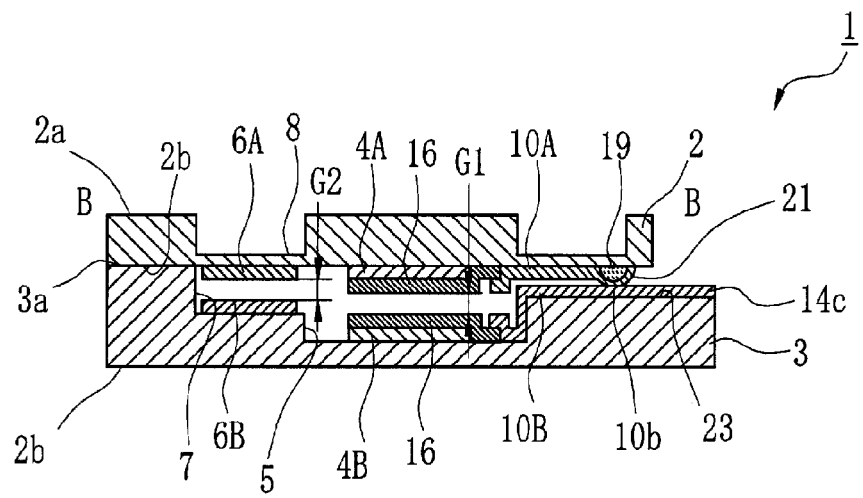
FIG. 6 is a cross-sectional view showing an optical filter of a second embodiment.
Figure 7:
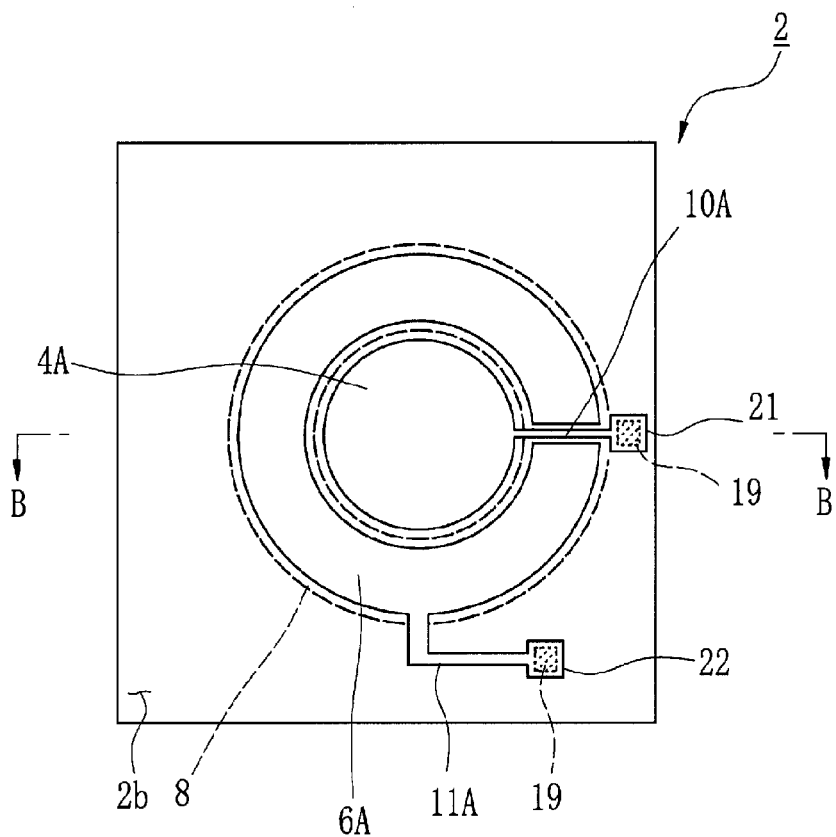
FIG. 7 is a plan view showing a first substrate constituting an optical filter of the second embodiment.
Figure 8:
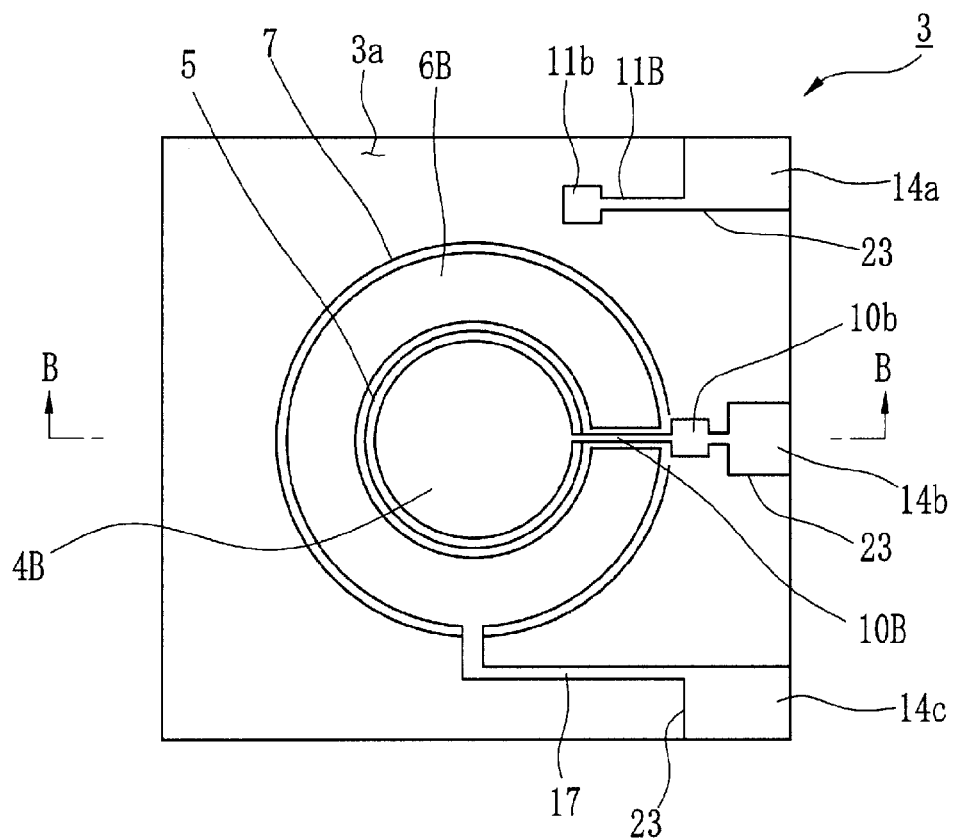
FIG. 8 is a plan view showing a second substrate constituting the optical filter of the second embodiment.

Next, a second embodiment of the invention will be described by using FIGS. 6 to 8. FIG. 6 is a cross-sectional view showing an optical filter of the second embodiment. FIG. 7 is a plan view of a first substrate constituting the optical filter of the second embodiment shown from a bonding surface side. FIG. 8 is a plan view of a second substrate shown from a bonding surface side.

The optical filter of the embodiment shown below is substantially similar to that of the aforementioned embodiment in basic configuration but is different in that the electrical conduction between the substrates is realized by bump connection. In the following description, therefore, a configuration different from that of the aforementioned embodiment will be described in detail, and the description for the common part is omitted. In the drawings used for the description, the common constituent elements with those in FIGS. 1 to 5D are denoted by the same reference numerals and signs.

As shown in FIGS. 6 to 8, the optical filter 1 of the embodiment includes the first substrate 2 and the second substrate 3. The first substrate 2 has the movable mirror 4A, the first electrode 6A, the inter-substrate conducting wire 11A, and the first wire 10A disposed on the bonding surface 2b. The second substrate 3 has the fixed mirror 4B, the second electrode 6B, the inter-substrate conducting wire 11B, and the second wire 10B disposed on the bonding surface 3a. On each of portions of the bonding surfaces 2b and 3a to be bonded to the facing substrate, a dielectric film (not shown) with which the surface activated bonding is applicable, such as a silicon nitride film, is formed.

The first wire 10A and the inter-substrate conducting wire 11A that are disposed on the first substrate of the embodiment are respectively provided with bump connection portions 21 and 22 each having an elastic body 19 therein on their one end (ends on the opposite side of ends connected to the mirror 4A and the first electrode 6A) sides. The bump connection portions 21 and 22 are respectively connected to the connection portion 10b of the second wire 10B and the connection portion 11b of the inter-substrate conducting wire 11B that are disposed on the second substrate 3. As a material for the first wire 10A and the inter-substrate conducting wire 11A, Au is preferably used so that the bump easily deforms at the time of connection.

The second wire 10B, the inter-substrate conducting wire 11B, the electrode pads 14a, 14b, and 14c, and the wire 17 are formed in grooves 23 disposed on the bonding surface 3a of the second substrate 3. The bump connection portions 21 and 22 on the first substrate 2 side are respectively connected to the corresponding connection portions 10b and 11b in a state where the bump connection portions 21 and 22 enter the respective grooves 23.

In the case where the optical filter 1 having such a bump connection structure is manufactured, when the first substrate 2 and the second substrate 3 are bonded together by surface activated bonding via silicon nitride films (not shown) disposed on the bonding surfaces 2b and 3a of the first substrate 2 and the second substrate 3, the bump connection portion 21 of the first wire 10A and the connection portion 10b in each of filter regions A are brought into contact, and the bump connection portion 22 of the inter-substrate conducting wire 11A and the connection portion 11b of the inter-substrate conducting wire 11B are brought into contact. Pressing of the substrates 2 and 3 to each other deforms the bump connection portions 21 and 22, whereby the movable mirror 4A and the fixed mirror 4B are electrically connected without influencing the first gap G1.

According to the configuration of the embodiment, since the bump connection portion 21 (22) having the elastic body 19 as a core is provided, the substrates 2 and 3 are bonded together while pressing the bump connection portion 21 (22). Therefore, the mirrors 4A and 4B can be reliably connected to each other via the bump connection portion 21. Moreover, since the bump connection portions 21 and 22 are so-called resin core bumps, it is possible to prevent electrical contacts by the bump connection portions 21 and 22 from being broken by thermal deformation caused by an increase in temperature during the operation of the optical filter 1.

Third Embodiment

Figure 9:
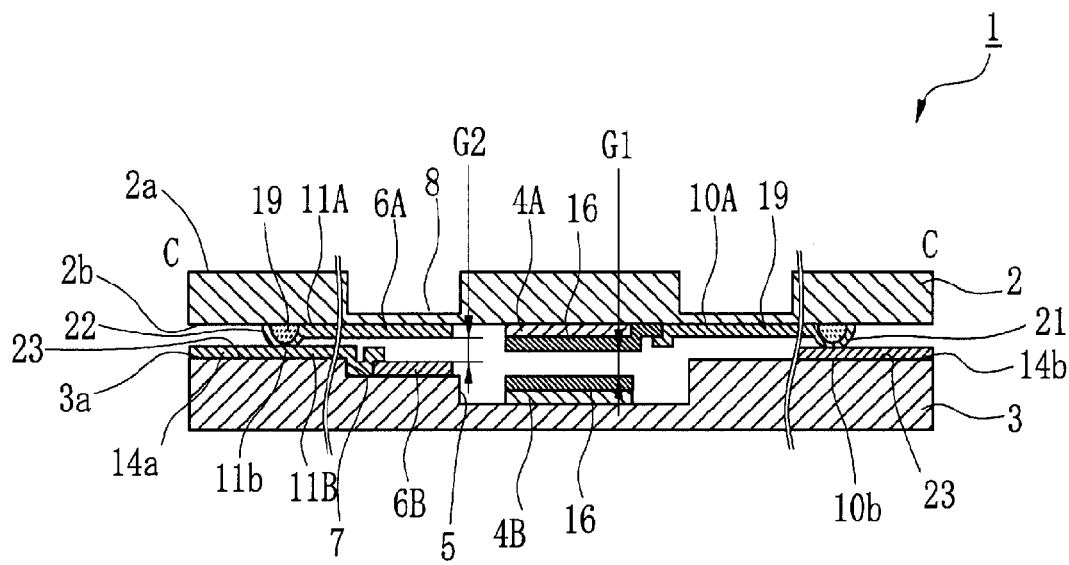
FIG. 9 is a cross-sectional view showing a first substrate constituting an optical filter of a third embodiment.
Figure 10A:
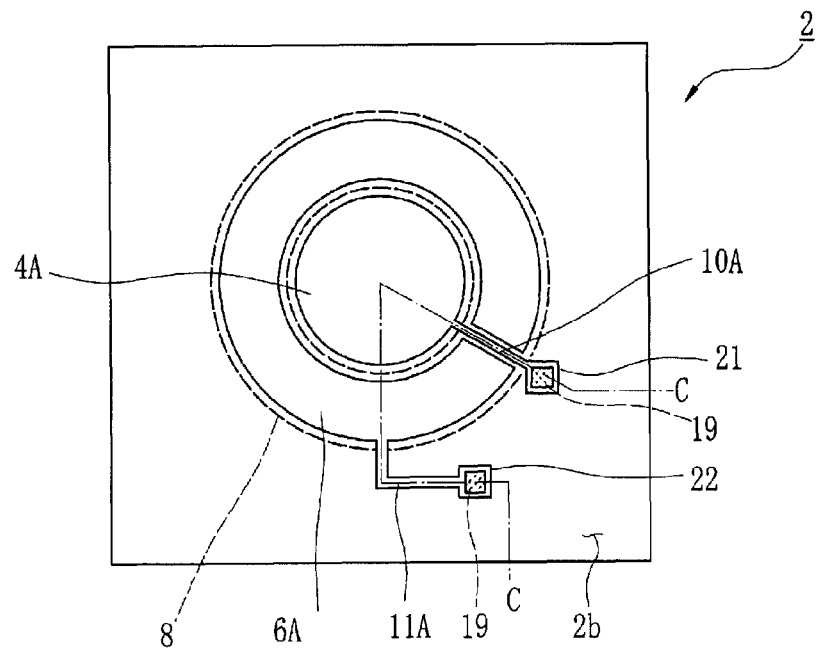
FIGS. 10A and 10B are plan views showing a second substrate constituting the optical filter of the third embodiment.
Figure 10B:
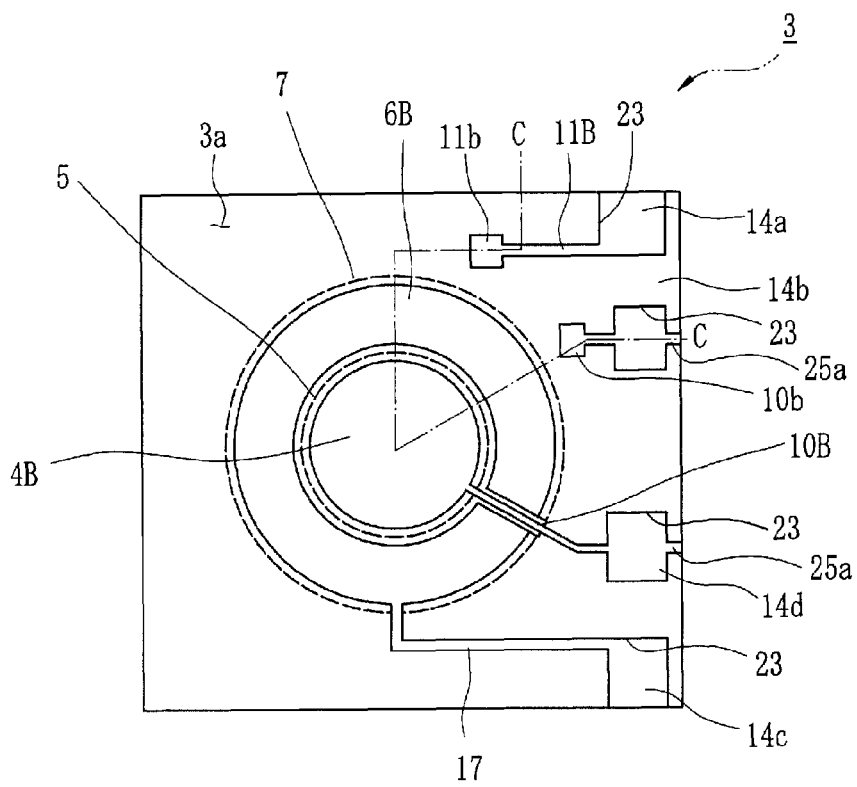

Next, a third embodiment of the invention will be described by using FIGS. 9 and 10A and 10B. FIG. 9 is a cross-sectional view showing an optical filter of the third embodiment. FIG. 10A is a plan view of a first substrate constituting the optical filter of the third embodiment shown from a bonding surface side. FIG. 10B is a plan view of a second substrate shown from a bonding surface side.

As shown in FIG. 9, the optical filter of the embodiment is different from those of the aforementioned embodiments in that the mirrors 4A and 4B are insulated from each other in a completed state.

As shown in FIG. 9, the movable mirror 4A is connected to the electrode pad 14b on the second substrate 3 side via the bump connection portion 21 of the first wire 10A and the connection portion 10b of the second wire 10B. On the other hand, the first electrode 6A disposed on the first substrate 2 is connected to the electrode pad 14a on the second substrate 3 via the bump connection portion 22 of the inter-substrate conducting wire 11A and the connection portion 11b of the inter-substrate conducting wire 11B.

As shown in FIGS. 10A and 10B, on the second substrate 3 of the embodiment, an electrode pad 14d connected to the fixed mirror 4B is further disposed in addition to the electrode pad 14a connected to the first electrode 6A, the electrode pad 14b connected to the movable mirror 4A, and the electrode pad 14c connected to the second electrode 6B. The mirrors 4A and 4B are respectively connected to the different electrode pads 14b and 14d. The same potential is input to the electrode pads 14b and 14d, making it possible to prevent the mirrors 4A and 4B from being charged due to driving of the static actuator.

Figure 11A:
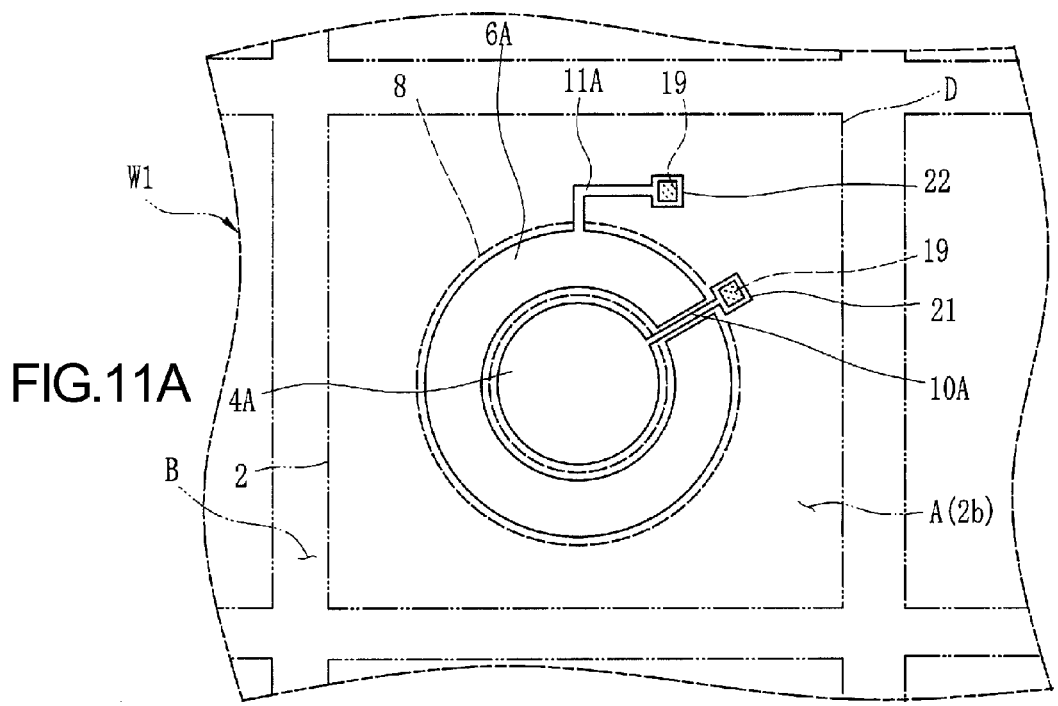
FIGS. 11A and 11B are plan views showing a method for manufacturing the optical filter of the third embodiment.
Figure 11B:
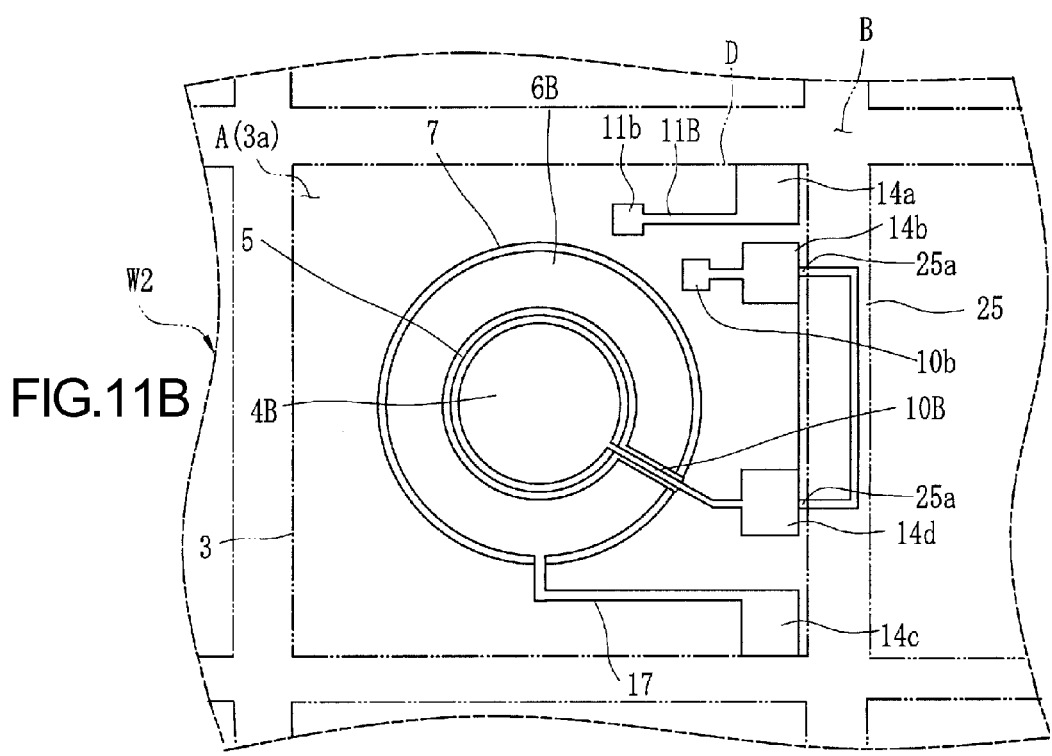

Next, an exemplary method for manufacturing the optical filter of the embodiment will be described by using FIGS. 11A and 11B. FIG. 11A is a plan view showing a glass wafer W1. FIG. 11B is a plan view showing a glass wafer W2.

In the embodiment, a plurality of the optical filters 1 are collectively formed by using the glass wafers W1 and W2. The glass wafers W1 and W2 are portions serving as the first substrate 2 and the second substrate 3 of the optical filter 1 after dividing into individual pieces. FIGS. 11A and 11B show the filter region A (region corresponding to one optical filter 1) in an enlarged scale.

As shown in FIGS. 11A and 11B, the glass wafers W1 and W2 previously subjected to a predetermined process are first prepared. On the glass wafers W1 and W2, the diaphragm portion 8, the recessed portions 5 and 7, etc. have been formed, and the above-described constituent members are formed in the respective filter regions A on the surface sides facing each other at the time of bonding.

Specifically, in each of the filter regions A of the glass wafer W1, the first electrode 6A, the movable mirror 4A, the first wire 10A having the bump connection portion 21, the inter-substrate conducting wire 11A having the bump connection portion 22, etc. are formed. In each of the filter regions A of the glass wafer W2, the second electrode 6B, the fixed mirror 4B, the second wire 10B, the inter-substrate conducting wire 11B, the wire 17, and the plurality of electrode pads 14a, 14b, 14c, and 14d are formed.

On the glass wafers W1 and W2 of the embodiment, a dicing region B is disposed around each of the filter regions A. In this case, in each of the dicing regions B on the glass wafer W2 side, a connection wire 25 that connects between the electrode pad 14b and the electrode pad 14d formed in each of the filter regions A is pattern formed simultaneously with the electrode pads etc.

Next, surface activation treatment is applied to the bonding surfaces (the respective bonding surfaces 2b and 3a) of the glass wafers W1 and W2, and thereafter the glass wafers W1 and W2 are overlapped and bonded together. As described above, since the connection wire 25 that connects between the electrode pads 14b and 14d is formed in each of the filter regions A on the glass wafer W2, the movable mirror 4A and the fixed mirror 4B can be electrically connected when the glass wafers W1 and W2 are bonded together. By bonding the substrates 2 and 3 together in the state where the mirrors 4A and 4B are short-circuited to have the same potential, sticking of the mirrors 4A and 4B together can be eliminated.

The glass wafers W1 and W2 together are next divided into individual filter regions A along dicing lines D in FIGS. 11A and 11B. The connection wire 25 is cut by dicing after bonding, and therefore the electrode pad 14b and the electrode pad 14d are electrically separated, making it possible to supply respective independent potentials to the mirrors 4A and 4B.

With this configuration, gap measurement is also possible based on capacitance detection due to the electrode pads 14b and 14d. By changing the wire pattern of the connection wire 25, it is possible to maintain the electrode pads 14b and 14d in a state of being electrically connected to each other also at the time of dicing. This can be realized by forming the connection wire 25 in the filter region A.

On the second substrate 3 of the optical filter of the embodiment, parts of the connection wire 25 that had connected between the electrode pads 14b and 14d are present as remaining portions 25a and 25a as shown in FIG. 10B.

Figure 12:
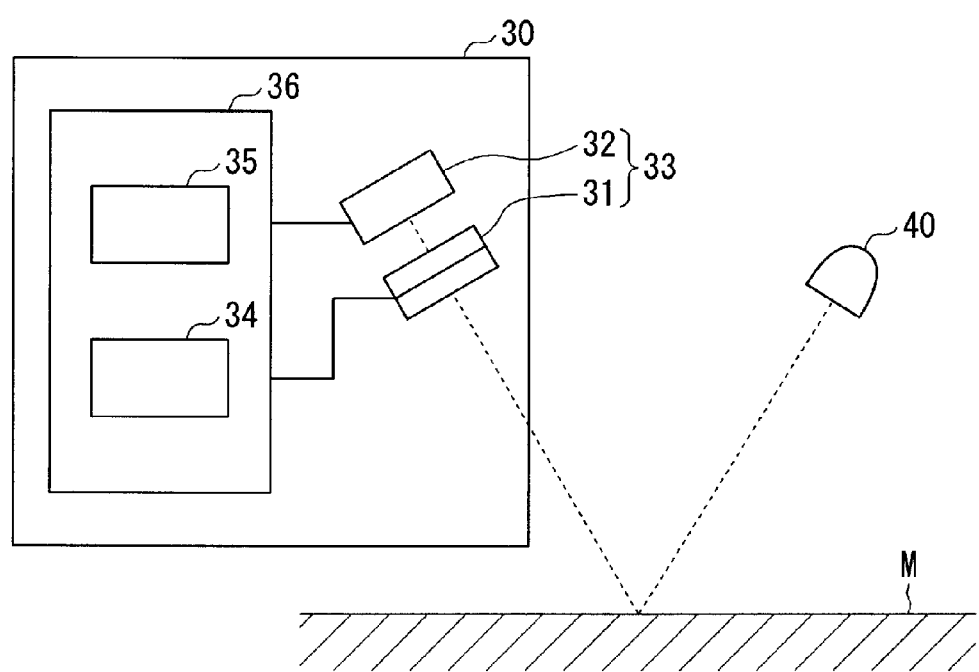
FIG. 12 shows an example of a colorimeter as an analyzer of the invention.

Next, a colorimeter 30 as an analyzer including the above-described optical filter of the invention will be described as an application example. FIG. 12 shows an example of the colorimeter 30 of the invention.

The colorimeter 30 includes an optical filter device 33 including an optical filter 31 (the optical filter 1 of the invention) and a light-receiving element 32 and a circuit portion 36 including a drive circuit portion 34 and a measurement circuit portion 35. As the light-receiving element 32, a photodiode or the like can be used, for example. The circuit portion 36 may have an amplifier circuit portion. In the colorimeter 30 (analyzer), light reflected by an object M to be measured is incident on the optical filter 31, the drive circuit portion 34 controls the gap between a first mirror and a second mirror of the optical filter 31, the light-receiving element 32 receives light having passed through the optical filter 31 with the controlled gap, the light-receiving element 32 generates an electric signal corresponding to the amount of the received light, and the measurement circuit portion 35 measures the amount of the passed light based on the generated electric signal. A light source 40 may be incorporated in the colorimeter 30.

The colorimeter 30 as an analyzer has been exemplified as the application example. An analyzer is also applicable to, for example, a gas detector that performs gas detection by detecting an absorption wavelength specific to a gas. Moreover, an analyzer is applicable to, for example, an optical apparatus that extracts a desired wavelength from light transmitted through a light-transmitting medium such as an optical fiber. Further, an analyzer is also applicable to, for example, a hyperspectral camera.

The preferred embodiments according to the invention have been described with reference to the accompanying drawings. However, it is needless to say that the invention is not limited to the embodiments. It is apparent that a person skilled in the art can conceive various changed or modified examples within a range of the technical idea set forth in the claims. It will be naturally understood that those examples fall in the technical range of the invention.

In the aforementioned embodiments, although the mirror has the stacked structure of dielectric films and conductive films, the mirror may include only a metal film such as of Ag.

The optical filters in the aforementioned embodiments can be applied to a colorimetric sensor, an optical communication sensor, a gas sensor, etc., for example.

The entire disclosure of Japanese Patent Application Nos. 2009-127877, filed May 27, 2009 and 2010-085353, filed Apr. 1, 2010 are expressly incorporated by reference herein.

What is claimed is:

1. An optical filter comprising:
a first substrate and a second substrate that are disposed to face each other;
a first mirror and a first electrode that are disposed on a second substrate side of the first substrate; and
a second mirror and a second electrode that are disposed on a first substrate side of the second substrate,
wherein the first mirror and the second mirror are electrically connected via a wire to have a same electric potential;
the wire includes a first wire that is extended from the first mirror to a bonding region of the first substrate, and a second wire that is extended from the second mirror to a bonding region of the second substrate, wherein the first wire and the second wire are connected to each other in the bonding regions; and
the first mirror and the second mirror are separated by an air gap.

2. The optical filter according to claim 1, wherein one of the first mirror and the second mirror is connected to an external connection terminal.

3. The optical filter according to claim 1, wherein a bump structure having an elastic body therein is formed at a connection portion of the first wire and the second wire.

4. The optical filter according to claim 1, wherein the first mirror and the second mirror are configured to include a conductive film.

5. The optical filter according to claim 1, wherein the first mirror and the second mirror have a stacked structure of a light-transmissive conductive film and a dielectric film.

6. An optical filter comprising:
a first substrate and a second substrate that are disposed to face each other;
a first mirror and a first electrode that are disposed on a second substrate side of the first substrate; and
a second mirror and a second electrode that are disposed on a first substrate side of the second substrate,
wherein the first mirror and the second mirror are directly electrically connected via a wire to have a same electric potential,
the wire including a first wire that is extended from the first mirror to a bonding region of the first substrate, and a second wire that is extended from the second mirror to a bonding region of the second substrate, wherein the first wire and the second wire are connected to each other in the bonding regions.

7. The optical filter according to claim 6, wherein one of the first mirror and the second mirror is connected to an external connection terminal.

8. The optical filter according to claim 6, wherein the first mirror and the second mirror are configured to include a conductive film.

9. The optical filter according to claim 6, wherein the first mirror and the second mirror have a stacked structure of a light-transmissive conductive film and a dielectric film.

10. An optical filter comprising:
a first substrate and a second substrate that are disposed to face each other;
a first mirror and a first electrode that are each directly disposed on a surface of the first substrate that faces the second substrate; and
a second mirror and a second electrode that are each directly disposed on a surface of the second substrate that faces the first substrate,
wherein the first mirror and the second mirror are electrically connected via a wire to have a same electric potential, the wire including a first wire that is extended from the first mirror to a bonding region of the first substrate, and a second wire that is extended from the second mirror to a bonding region of the second substrate, wherein the first wire and the second wire are connected to each other in the bonding regions.

11. The optical filter according to claim 10, wherein one of the first mirror and the second mirror is connected to an external connection terminal.

12. The optical filter according to claim 10, wherein the first mirror and the second mirror are configured to include a conductive film.

13. The optical filter according to claim 10, wherein the first mirror and the second mirror have a stacked structure of a light-transmissive conductive film and a dielectric film.

* * * * *